United States Patent [19]

Banu et al.

[11] Patent Number: 5,757,872
[45] Date of Patent: May 26, 1998

[54] CLOCK RECOVERY CIRCUIT

[75] Inventors: Mihai Banu; Alfred Earl Dunlop, both of Murray Hill; Wilhelm Carl Fischer, Westfield; Thaddeus John Gabara, Murray Hill, all of N.J.; Kalpendu Ranjitrai Shastri, Allentown, Pa.

[73] Assignee: Lucent Technologies Inc., Murray Hill, N.J.

[21] Appl. No.: 346,795

[22] Filed: Nov. 30, 1994

[51] Int. Cl.⁶ .............................. H04L 7/00; H04L 25/36; H04L 25/40
[52] U.S. Cl. ............................... 375/372; 370/505
[58] Field of Search ......................... 375/354, 371, 375/372, 373; 370/100.1, 503, 505; 327/2, 141, 144, 147, 149, 150, 155, 156; 331/1 R, 2, 25, 46, DIG. 2

[56] References Cited

U.S. PATENT DOCUMENTS

| | | | |
|---|---|---|---|
| 4,392,234 | 7/1983 | Maruta | 375/372 |
| 4,393,279 | 7/1983 | Cochrane et al. | 375/372 |
| 4,823,365 | 4/1989 | Loginov | 375/372 |
| 4,928,275 | 5/1990 | Moore et al. | 375/372 X |
| 5,077,761 | 12/1991 | Tokunaga | 375/371 |
| 5,237,290 | 8/1993 | Banu et al. | 331/2 |
| 5,255,293 | 10/1993 | Archer et al. | 375/372 |
| 5,272,728 | 12/1993 | Ogawa | 375/372 |
| 5,274,681 | 12/1993 | Yamada et al. | 375/372 |
| 5,402,425 | 3/1995 | Bladh | 375/372 |

FOREIGN PATENT DOCUMENTS

| | | |
|---|---|---|
| 87/06085 | 10/1987 | European Pat. Off. . |
| 2228848 | 9/1990 | European Pat. Off. . |
| 3600795 | 7/1987 | Germany . |

OTHER PUBLICATIONS

*Introduction to VLSI Systems*, Addison–Wesley Series in Computer Science. Consulting Editor, Michael A. Harrison. 1980, pp. 258–260.

*Primary Examiner*—Stephen Chin
*Assistant Examiner*—Bryan Webster

[57] ABSTRACT

A clock recovery circuit is coupled to an elastic storage circuit such as a FIFO circuit. More specifically, a first input of the elastic storage circuit is electrically connected to an output of the clock recovery circuit. A second input for accepts a data signal representing an input data stream from a communications medium. A third input accepts a local clock signal. The resultant circuit may be used in receiver's for communications systems to help alleviate the problems of frequency mismatch and jitter.

23 Claims, 4 Drawing Sheets

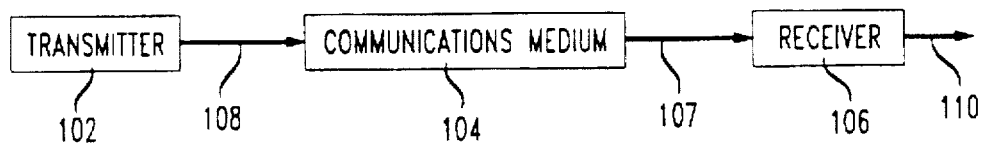
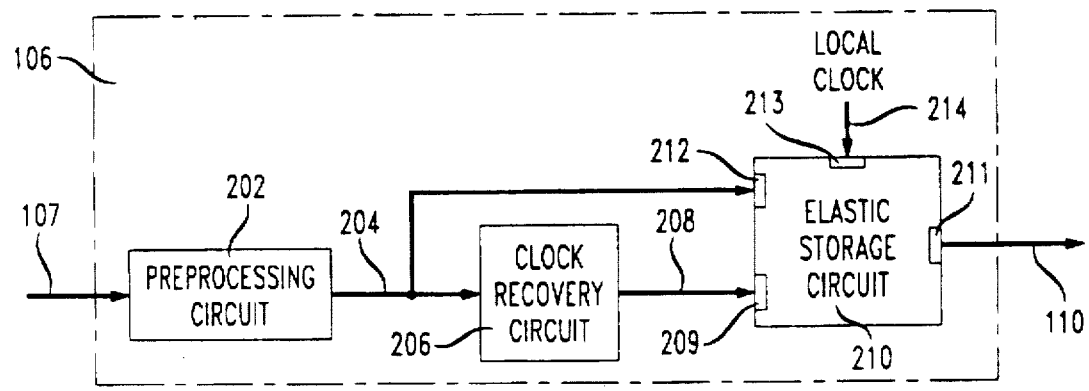
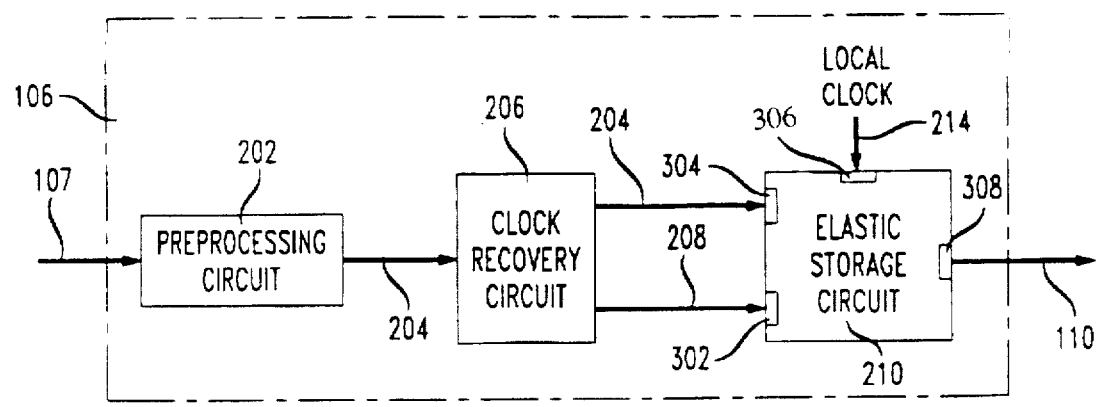

1

CLOCK RECOVERY CIRCUIT

FIELD OF THE INVENTION

The present invention relates to a circuit for recovering data from a communications channel.

BACKGROUND OF THE INVENTION

There are numerous manners in which to transfer data from a transmitter to a receiver. The transmitter has clock circuitry which controls the speed at which data is transferred via a communications medium. The receiver also has clock circuitry which controls the speed at which the data that is received from the communications medium is processed.

Ideally, the receiver's clock and the transmitter's clock will operate at exactly the same frequency and will be appropriately aligned in phase. However, the transmitter's clock and the receiver's clock are typically close but not identical in frequency, resulting in slight frequency mismatch. Further, the communications medium typically introduces "jitter" (i.e., time shifting of the signal relative to the rise and fall of the transmitter's clock signal) into the data.

Previously, receivers used over sampling, phase locked loops ("PLLs") or surface acoustic wave filters ("SAW" filters) to address the problems of jitter and small differences in clock frequencies. However, for at least two different reasons, these techniques have proved inadequate in certain applications. First, in PLLs and SAW filters, if data is sent from a first transmitter, then stopped, and then sent from a second transmitter, the receiver may observe a significant phase change between a first bit stream (from the first transmitter) and a second bit stream (from the second transmitter). The receiver must be able to detect and adapt to this phase change as quickly as possible to avoid an effective reduction in bandwidth of the communications medium due to time that must be allocated for resynchronization. Second, over sampling techniques, wherein a clock operates at, e.g., eight times the data rate, require a significant amount of power to operate such a clock.

More recently, new clock recovery circuits have been created that instantaneously or very quickly adjust to phase changes in data coming from the communications medium. Unfortunately, these instantaneous or very quickly adjusting clock recovery circuit pass on much, if not all, of the jitter in the data.

SUMMARY OF THE INVENTION

We have discovered that the use of a clock recovery circuit coupled to an elastic storage circuit alleviates the above problems. More specifically, the elastic storage circuit uses three inputs and one output. A first input of the elastic storage circuit is electrically coupled to an output of the clock recovery circuit. A second input for accepts a data signal representing an input data stream from a communications medium. A third input accepts a local clock signal.

Advantageously, the present invention alleviates the frequency mismatch problem.

Also advantageously, the present invention alleviates the jitter problem.

BRIEF DESCRIPTION OF THE FIGURES

FIG. 1 is a communication system in which the present invention may be used;

FIG. 2 is a first embodiment of the receiver of FIG. 1;

FIG. 3 is a second embodiment of the receiver of FIG. 1;

Figure 4:
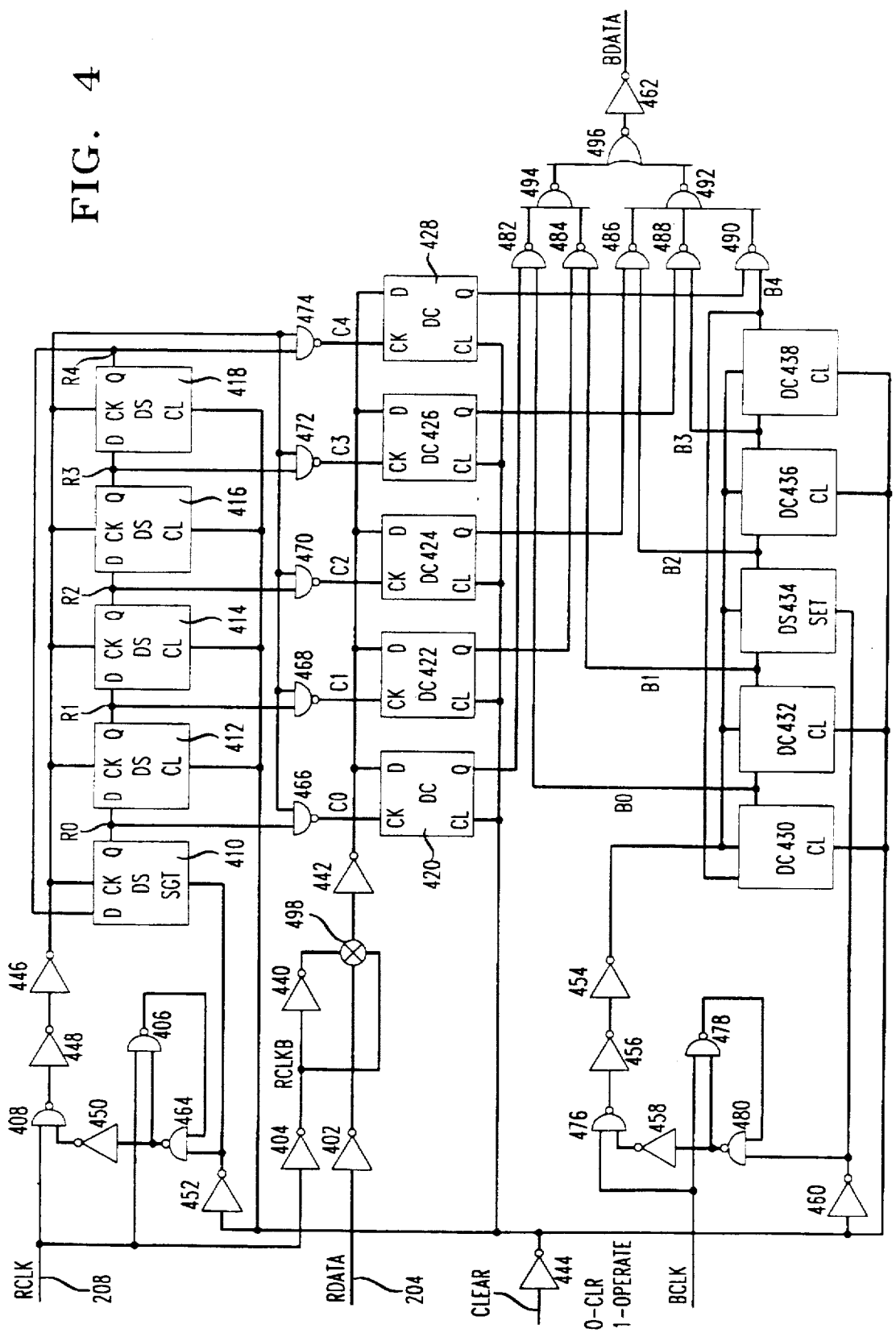
FIG. 4 is a first embodiment of what may be used as the elastic storage circuit of FIGS. 2 and/or 3.

DETAILED DESCRIPTION:

For clarity of explanation, the illustrative embodiments of the present invention are presented as comprising individual functional blocks. The functions these blocks represent may be provided through the use of either shared or dedicated hardware, including, but not limited to, hardware capable of executing software. Use of the term "processor" should not be construed to refer exclusively to hardware capable of executing software.

FIG. 1 is comprised of a transmitter 102, a communications medium 104, and a receiver 106, connected as shown. Data 108 is output by the transmitter 102, carried by the communications medium 104, and arrives at the receiver 106 as an input data stream 107. The receiver 106 decodes the data signal to produce an output data stream 110.

FIG. 2 shows that the receiver 106 is comprised of preprocessing circuit 202. The preprocessor circuit 202 processes the input data stream 107 to produce a data signal 204. The data signal 204 is input into a clock recovery circuit 206 which uses the data signal 204 to generate a clock signal 208 having a proper phase relationship to the data signal 204. An example of the clock recovery circuit 206 is described in U.S. Pat. No. 5,237,290, entitled "Method And Apparatus For Clock Recovery" and assigned to the assignee of the present invention, which is hereby incorporated by reference as if set forth in its entirety. An elastic storage circuit 210 has a first input 209 which receives the clock signal 208 and has an output 211 which outputs the output data stream 110.

Again referring to FIG. 2, the elastic storage circuit 210 has a second input 212 and a third input 213. The second input 212 accepts the data signal 204 which represents the input data stream 107. In this embodiment, the data signal 204 is input directly into the second input. As will be apparent to those skilled in the art, flip-flops may be used to provide delay and/or synchronization such that the clock signal 208 and the data signal 204 are in proper relationship. The third input 213 accepts a local clock signal 214.

FIG. 3 is similar to FIG. 2 and shows the elastic storage circuit 210 having a first input 302, a second input 304, a third input, 306, and an output 308. The first input 302 is electrically coupled to the clock recovery circuit 206 and receives the clock signal 208. The second input 304 is also coupled the clock recovery circuit 206 and receives the data signal 204 in delayed form. In other words, the second input 304 receives the same signal as the second input 212 of FIG. 2 except that the data signal 204 is already delayed by, e.g., a flip-flop in the clock recovery circuit 206, prior to reaching the second input 304. However, in FIG. 2, the data signal 204 is not delayed prior to reaching the second input 212 (although there may be a delay element in the elastic storage circuit 210 which provides this delay). The third input 306 accepts the local clock signal 214.

Those skilled in the art will realize that there may be any number of delay elements, or no delay elements, associated with the data signal in both FIGS. 2 and 3 provided that the data signal 204 and the clock signal 208 are in proper relationship. Thus, if one were to use the clock recovery circuit 206 as shown in U.S. Pat. No. 5,237,290 (which does not show a storage element), one would implement FIG. 2 (and place a storage element in the elastic storage circuit 210).

FIG. 4 shows a first embodiment of the elastic storage circuit 210. The circuit as shown could be used in conjunction with FIG. 3. With FIG. 2, however, delay elements may be interposed as appropriate between the data signal 204 (e.g., "RDATA") and inverter 402. The clock signal 208 (e.g., "RCLK") is input into inverter 404 and NAND gates 406 and 408. Flip-flops 410 through 438 (even numbers only), inverters 402, 404, and 440 through 462 (even numbers only), NAND gates 406, 408, and 464 through 494 (even numbers only), NOR gate 496, and device 498, which is a transmission gate, are all connected as shown to operate as a first-in-first-out ("FIFO") logic circuit. FIFO circuits and their operation are well known. See Mead and Conway, Introduction To VLSI Systems, Addison-Wesley, pages 258–260 (1980). The first input 209/302 accepts the RCLK signal as its input. The second input 212/304 accepts the RDATA signal as its input. The third input 213/306 accepts the BCLK signal as its input. The output data stream 110 is represented by the BDATA signal. This elastic storage circuit 210 may be used with any clock recovery circuit 206, such as a narrowband PLL, but is most advantageous when used with instantaneous or very rapid clock recovery circuits 206 such as the clock recovery circuit described in U.S. Pat. No. 5,237,290. Narrowband PLLs and SAW filters take about 1000 incoming data transitions before assuring phase lock. Broadband PLLs take 10 or more incoming data transitions before assuring phase lock. However, a circuit made in accordance with U.S. Pat. No. 5,237,290 improves on this figure in that it takes two or less incoming data transitions before assuring phase lock.

Figure 5:
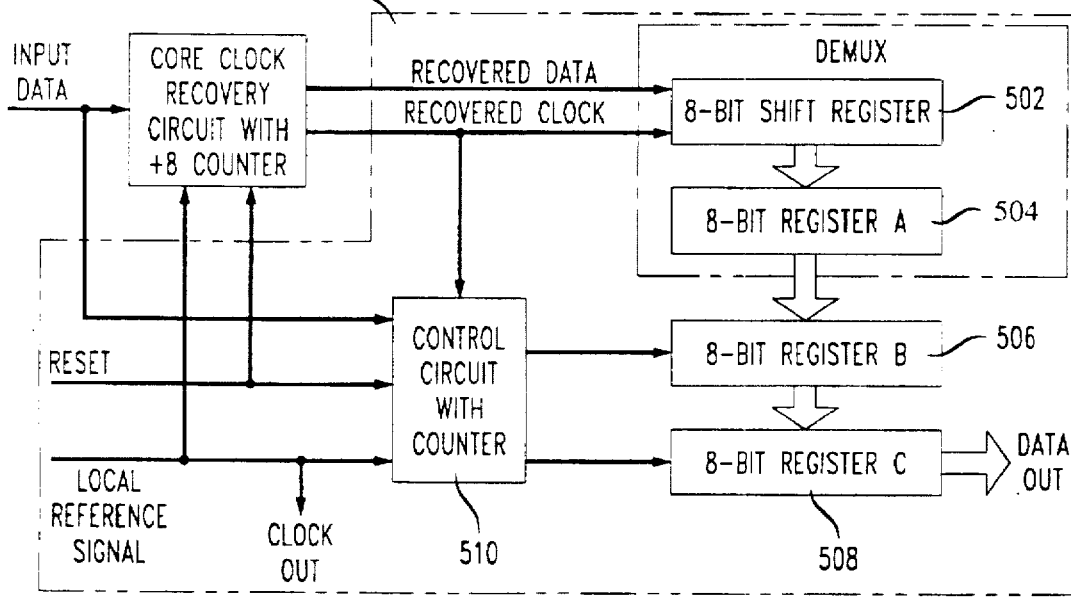
FIG. 5 is a second embodiment of what may be used as the elastic storage circuit of FIGS. 2 and/or 3.

FIG. 5 shows a second embodiment of the elastic storage circuit 210. The circuit as shown could be used in conjunction with FIG. 3. With FIG. 2, however, delay elements may be interposed as appropriate between the data signal 204 and a shift register 502. The clock signal 208 is also input into a shift register 502. The elastic storage circuit 210 is comprised of shift register 502, registers 504, 506, and 508 and control circuit/counter 510 connected as shown. Shift register 502 and register 504 form a demultiplexer. The first input 209/302 accepts the "Recovered Clock" signal as its input. The second input 212/304 accepts the "Recovered Data" signal as its input. The third input 213/306 accepts the "Local Reference Signal" as its input. Generally, the data rate is equal to $2^N$ times the "Local Reference Signal" where N is an integer. As shown in FIG. 5, N is equal to three. The output data stream is represented by the "Data Out" signal.

Figure 6:
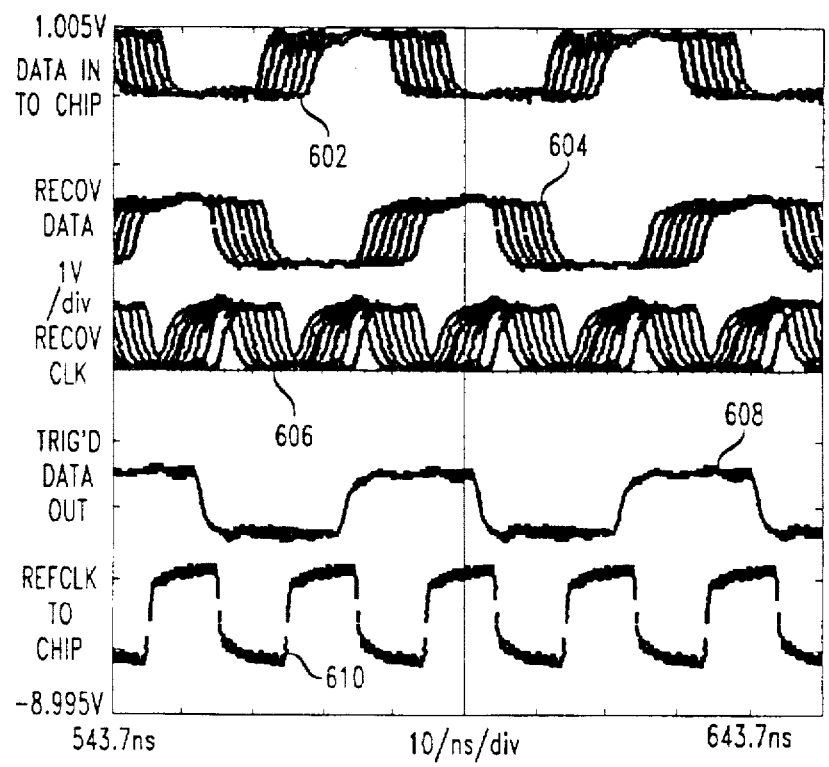
FIG. 6 is a graph of signals used and produced by the elastic storage means of FIG. 4.

Having described two embodiments of the elastic storage circuit 210, some signals used and produced by the receiver 106 using the elastic storage circuit 210 shown in FIG. 4 will be described with reference to FIG. 6. Waveform 602 shows the input data stream 107 that is input into the preprocessor circuit 202. Waveform 604 shows the RDATA signal (e.g., data signal 204), chosen for experimental purposes to alternate between HI and LO, that is input into the second input 212/304. Waveform 606 shows the RCLK signal that is input into the first input 209/302. As is appreciated by those skilled in the art, waveforms 602, 604, and 606 suffer from jitter introduced in the communications medium 104. However, typically, the jitter introduced by the communications medium 104 is random in nature as opposed to the "controlled" jitter shown in FIG. 6. However, once the waveforms 604 and 606 are processed in the elastic storage circuit 210, the jitter is no longer present, as evidenced by waveforms 608 and 610 which represent the output data stream 110 and local clock signal 214 (if desired), respectively.

Figure 7:
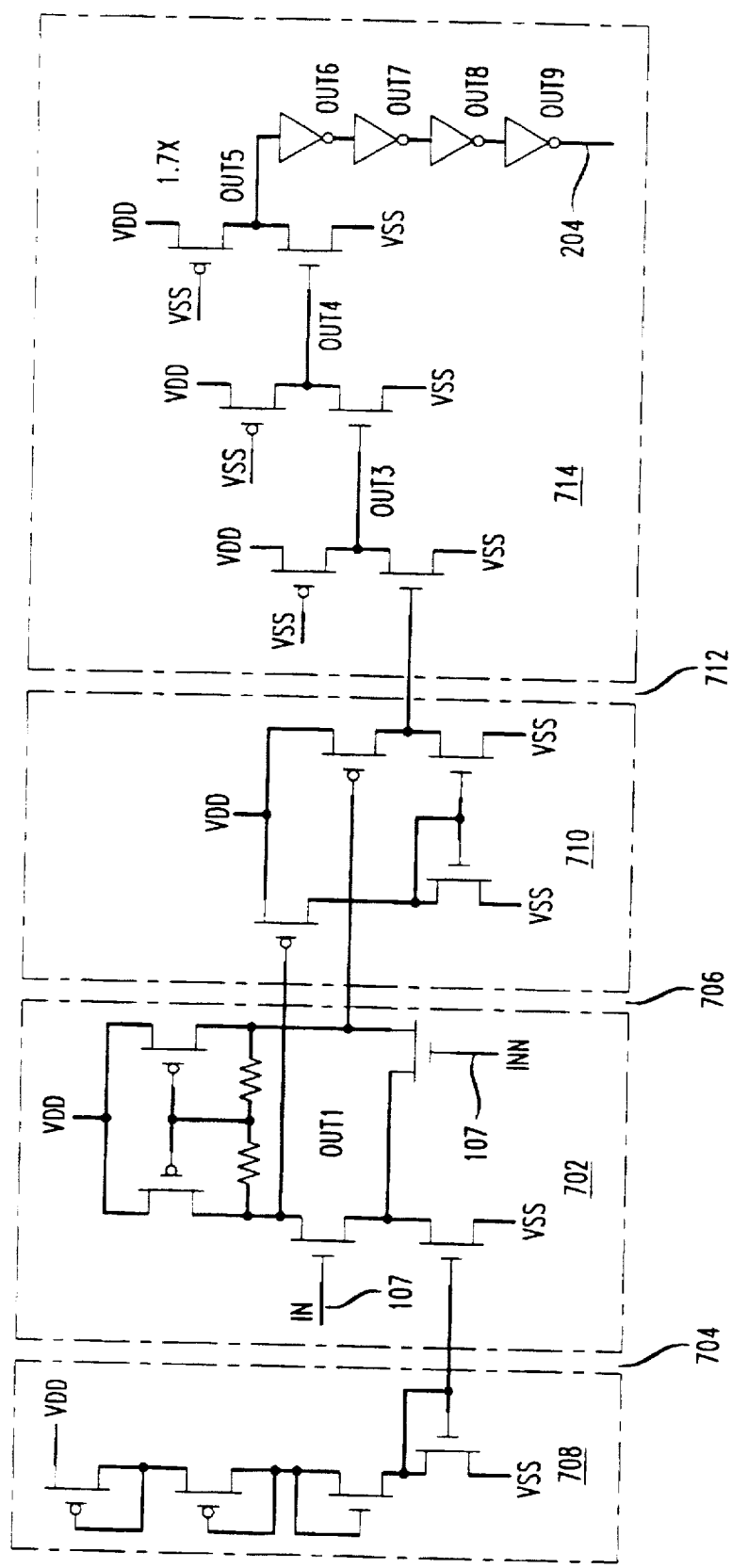
FIG. 7 is a schematic of the preprocessing circuit of FIGS. 2 or 3.

Preprocessing circuit 202 is shown in detail in FIG. 7. The circuit functions to take signals having small voltage swings (10–20 millivolts) from, e.g., an optical fiber receiver, and convert the swings into larger voltage swings (e.g., traditionally 0–5 volts) better suited for use by the clock recovery circuit 206. Essentially, the preprocessing circuit 202 is comprised of a first differential amplifier 702, shown between dashed lines 704 and 706. The inputs to the differential amplifier 702 are "in" and "inn", which are essentially the input data stream 107 (which may be a differential inputs attached to "in" and "inn". A bias means 708, shown as a current source appearing to the left of dashed line 704, is used to bias the differential amplifier 702. A second differential amplifier 710 is shown between dashed lines 706 and 712 and functions to provide additional gain. Those skilled in the art will realize that additional forms of differential amplifiers may be used. Gain circuitry 714, shown to the right of dashed line 712, creates additional gain for the data signal 204 which it eventually outputs. The data signal 204 is input into the clock recovery circuit 206 and processed as described above.

Those skilled in the art will realize that there are many modifications that one could make to the embodiments described above. For example, the input of the elastic storage circuit 210 may be electrically coupled to the output of the clock recovery circuit 206 via, e.g., delay elements, quadrature demultiplexers, and other devices known to those skilled in the art. Also, the preprocessing circuitry 202 may use a single differential amplifier or other appropriate circuit depending upon the necessary gain (as opposed to differential amplifier 702 and second differential amplifier 710). Further, a single ended input into the differential amplifier 702 can be achieved by biasing "inn" to an intermediate voltage of the signal "in". Finally, the first input 209 (302 of FIG. 3), the second input 212 (304 of FIG. 3), and the third input 213 (306 of FIG. 3), although shown as separate physical inputs, may be implemented as "logical" inputs. In other words, the ability to receive separate signals could be achieved with, e.g., a single physical input that receives different signals sequentially that it buffers until the receiver is ready to process all of the information. Although this may have certain disadvantages, this could be accomplished with, e.g., a multiplexer and buffers. Thus, the modifications described above, in addition to other modifications, may be implemented without departing from the scope of the claims.

Additionally, those skilled in the art will realize that there are many environments in which the invention may be used. For example, assuming that the communications medium 104 is a fiber optic cable, the preprocessing circuit 202 is comprised of an optical preamplifier. However, those skilled in the art will realize that the preprocessing circuit 202 may take on a variety of forms including but not limited to low noise amplifiers ("LNAs"), mixers, demodulators, and/or equalizers, which are dependent upon the communications medium 104 which includes but is not limited to wireless (e.g., RF and infrared) and electrical (e.g., coaxial cable, twisted pair) communications media. Further, the output data stream 110 may be at an intermediate location (i.e., not a final communications node such as a telephone, television, data processing unit, etc . . . ). In this case, the output data stream 110 may be carried by an additional communications medium including but not limited to electrical conductors such as coaxial cable, twisted pairs of wires, wireless communications media such as RF media, and additional fiber optic media. In these cases, another receiver that is similar, if not identical to the receivers described above, may be used in the final communications node. The communications nodes in which this another receiver may be used includes, but is not limited to, a telephone, a television, a set top box (typically used in conjunction with a television), and/or a data processing unit (e.g., a modem or other computer peripheral unit). Thus, the invention may be used in the environments described above without departing from the scope of the claims.

What we claim is:

1. A circuit comprising:
    (a) a clock recovery circuit receiving an input data stream and outputting a clock output, the clock recovery circuit substantially instantaneously adjusting the clock output to phase changes of data in the input data stream, the clock recovery circuit generating the clock output using only transmitted non-predetermined data and passing on bit-to-bit jitter;
    (b) an elastic storage circuit generating a jitter compensated output by receiving only the clock output, the transmitted non-predetermined data and an independent local clock signal, wherein the clock output of the clock recovery circuit is independent of the local clock signal.

2. The circuit of claim 1 further comprising a preprocessing circuit having an input and an output, the output of the preprocessing circuit being electrically coupled to the input of the clock recovery circuit.

3. The circuit of claim 1 wherein a second input of the elastic storage circuit is electrically coupled to a second output of the clock recovery circuit.

4. The circuit of claim 1 wherein the input data stream is a bit packet in asynchronous transfer mode format.

5. The circuit of claim 1 wherein the elastic storage circuit is a demultiplexer.

6. The circuit of claim 1 wherein the elastic storage circuit is comprised of a set of memory storage elements and a set of logic elements interconnected to operate as a first-in-first-out circuit.

7. The circuit of claim 6 wherein the set of memory storage elements is a set of flip-flops.

8. A communications link comprising:
    (a) a communications medium; and
    (b) a circuit for outputting an output data stream representative of an input data stream that is output from the communications medium, the circuit comprising:
        (1) a clock recovery circuit receiving an input and outputting a clock output, the clock recovery circuit substantially instantaneously adjusting the clock output to phase changes of data in the input data stream, the clock recovery circuit generating the clock output using only transmitted non-predetermined data and passing on bit-to-bit jitter; and
        (2) an elastic storage circuit generating a jitter compensated output by receiving only the clock output, the transmitted non-predetermined data and an independent local clock signal, wherein the clock output of the clock recovery circuit is independent of the local clock signal.

9. The communications link of claim 8 wherein the communications medium is a fiber optic medium.

10. The communications link of claim 8 wherein the communications medium is a wireless medium.

11. The communications link of claim 10 wherein the wireless medium is an RF medium.

12. The communications link of claim 10 wherein the wireless medium is an infrared medium.

13. The communications link of claim 8 wherein the communications medium is an electrical conductor.

14. The communications link of claim 8 further comprising a second communications medium for receiving the output data stream and forming a second output data stream for use by a communications node.

15. The circuit of claim 8 further comprising a preprocessing circuit having an input and an output, the output of the preprocessing circuit being electrically coupled to the input of the clock recovery circuit.

16. A communications apparatus having a circuit for processing an output data stream, the output data stream being representative of an input data stream that is output from a communications medium, the circuit comprising:
    (a) a clock recovery circuit receiving an input and outputting a clock output, the clock recovery circuit substantially instantaneously adjusting the clock output to phase changes in data of the input data stream, the clock recovery circuit generating the clock output using only transmitted non-predetermined data and passing on bit-to-bit jitter; and
    (b) an elastic storage circuit generating a jitter-compensated output by generating a jitter-compensated output receiving only the clock output the transmitted non-predetermined data and an independent local clock signal, wherein the clock output of the clock recovery circuit is independent of the local clock signal.

17. The communications apparatus of claim 16 wherein the communications apparatus is a telephone.

18. The communications apparatus of claim 16 wherein the communications apparatus is a television.

19. The communications apparatus of claim 16 wherein the communications apparatus is a data processing unit.

20. The communications apparatus of claim 16 wherein the communications apparatus is a set top box.

21. The circuit of claim 16 further comprising a preprocessing circuit having an input and an output, the output of the preprocessing circuit being electrically coupled to the input of the clock recovery circuit.

22. The circuit of claim 1, wherein the first input is directly, electrically connected to the output of the clock recovery circuit.

23. The circuit of claim 1, wherein the local clock signal operates at a fixed frequency.

* * * * *